United States Patent
Tsui et al.

(10) Patent No.: US 9,507,866 B2
(45) Date of Patent: Nov. 29, 2016

(54) GEOGRAPHICAL LOCATION RENDERING SYSTEM AND METHOD AND COMPUTER READABLE RECORDING MEDIUM

(75) Inventors: Wen Tsui, Zhubei (TW); Tai-Ting Wu, Zhubei (TW); Shin-Yi Wu, Taipei (TW); Yu-Hsiang Hsiao, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 326 days.

(21) Appl. No.: 13/604,278

(22) Filed: Sep. 5, 2012

(65) Prior Publication Data

US 2013/0156324 A1    Jun. 20, 2013

(30) Foreign Application Priority Data

Dec. 15, 2011   (TW) .............. 100146651 A (51) Int. Cl.
*G06N 5/02* (2006.01)
*G06F 17/30* (2006.01)

(52) U.S. Cl.
CPC ............. *G06F 17/3087* (2013.01); *G06N 5/02* (2013.01)

(58) Field of Classification Search
None
See application file for complete search history.

(56) References Cited

U.S. PATENT DOCUMENTS

| 7,031,909 B2* | 4/2006 | Mao et al. ................ 704/9 |
| 7,885,791 B2 | 2/2011 | Boettcher et al. |
| 8,699,759 B2 | 4/2014 | Gupta et al. |
| 8,949,284 B2 | 2/2015 | Zink et al. |
| 2003/0177000 A1 | 9/2003 | Mao et al. |
| 2008/0154942 A1 | 6/2008 | Tsai et al. |
| 2009/0132469 A1 | 5/2009 | White et al. |
| 2010/0106801 A1 | 4/2010 | Bliss et al. |
| 2011/0029474 A1 | 2/2011 | Lin |
| 2011/0071881 A1 | 3/2011 | Zheng et al. |

(Continued)

FOREIGN PATENT DOCUMENTS

| CN | 1774713 A | 5/2006 |
| CN | 101057123 A | 10/2007 |
| CN | 102156726 A | 8/2011 |

(Continued)

OTHER PUBLICATIONS

Kisilevich, S. et al. "P-DBSCAN: a density based clustering algorithm for exploration and analysis of attractive areas using collections of geo-tagged photos." Proceedings of the 1st International Conference and Exhibition on Computing for Geospatial Research & Application. ACM, 2010.*

(Continued)

*Primary Examiner* — Kakali Chaki
*Assistant Examiner* — Eric Nilsson
(74) *Attorney, Agent, or Firm* — McClure, Qualey & Rodack, LLP (57) ABSTRACT

A geographical location rendering method executed in a geographical location rendering system for identifying at least one semantic region is provided. A density clustering is performed on a plurality of user generated contents of respective geographical location name information to generate a plurality of region candidates. A name extraction is performed on the region candidates to extract and confirm a common region name of the region candidates as a name of the semantic region. A region scope of the region candidates is detected as a location scope of the semantic region according to a spatial density analysis.

19 Claims, 10 Drawing Sheets

(56) References Cited

U.S. PATENT DOCUMENTS

2011/0087685 A1    4/2011   Lin et al.
2013/0290332 A1*   10/2013  Carlsson et al. .............. 707/736

FOREIGN PATENT DOCUMENTS

| TW | I338846 | 3/2011 |
|---|---|---|
| TW | 201140466 A1 | 11/2011 |
| WO | WO 2012090017 A1 * | 7/2012 |

OTHER PUBLICATIONS

Twaroch, F., et al. "Acquisition of vernacular place names from web sources." Weaving Services and People on the World Wide Web. Springer Berlin Heidelberg, 2009. 195-214.*

Blessing, A., et al. "Automatic acquisition of vernacular places." Proceedings of the 10th International Conference on Information Integration and Web-based Applications & Services. ACM, 2008.*

Arampatzis, A., et al. "Web-based delineation of imprecise regions." Computers, Environment and Urban Systems 30.4 (2006): 436-459.*

English language translation of abstract of TW I338846 (published Mar. 11, 2011).

Lin, J., et al.; "Modeling People's Place Naming Preferences in Location Sharing;" pp. 1-10.

Kim, D.H., et al.; "Discovering Semantically Meaningful Places from Pervasive RF-Beacons;" pp. 1-10.

Intagorn, S., et al.; "Harvesting Geospatial Knowledge from Social Metadata;" Proceedings of the 7th International ISCRAM Conference; 2010; pp. 1-10.

Ankerst, M., et al.; "OPTICS: Ordering Points to Identify the Clustering Structure;" Proc. ACM SIGMOD Int. Conf. on Management of Data; 1999; pp. 1-12.

Ng, R.T., et al.; "Clarans: A Method for Clustering Objects for Spatial Data Mining;" IEEE Transactions on Knowledge and Data Engineering; vol. 14; No. 5; 2002; pp. 1003-1016.

Xu, X., et al.; "A Distribution-Based Clustering Algorithm for Mining in Large Spatial Databases;" pp. 1-8.

Ester, M., et al.; "A Density-Based Algorithm for Discovering Clusters in Large Spatial Databases with Noise;" Proceedings of 2nd International Conference on Knowledge Discovery and Data Mining; pp. 1-6.

TW Office Action dated Sep. 26, 2014.

CN Office Action dated Jun. 17, 2015 in corresponding Chinese application (No. 201210037466.X).

* cited by examiner

GEOGRAPHICAL LOCATION RENDERING SYSTEM AND METHOD AND COMPUTER READABLE RECORDING MEDIUM

CROSS REFERENCE TO RELATED APPLICATION

This application claims the benefit of Taiwan application Serial No. 100146651, filed Dec. 15, 2011, the disclosure of which is incorporated by reference herein in its entirety.

TECHNICAL FIELD

The disclosure relates to a geographical location rendering system and method and a computer readable recording medium.

BACKGROUND

In current location-based services and map services, in expressing location information or providing user queries, the queries are mainly based on longitude/latitude information, addresses and/or official administrative names. In these services, search results are not likely obtained according to non-official place names that are nicknames or commonly known names, e.g., The Big Apple or The Sin City. When searching for a non-official name, several issues may arise. First of all, on top of a huge amount of unofficial place names, new unofficial names are also constantly being created. Secondly, an unofficial place name is usually not clearly defined by geographical boundaries. Further, a scope of an unofficial place name may vary according to perspectives of different individuals.

A location rendering approach based on semantic is possibly a natural and effective way for location information sharing, exchange and judgment for a user. Through the semantic based location rendering approach, mobile applications and mobile commerce may also obtain useful information to provide services for satisfying user needs. However, a current location system operating principally on coordinates (longitude/latitude information, addresses and official administrative place names) is still insufficient for providing semantic information.

In embodiments of the disclosure, a possible scope and a name of a semantic region are identified. Throughout the specification, a semantic region, e.g., SoHo (in Manhattan, NYC), usually does not have clearly defined geographical boundaries but is distinct in character, i.e., having well-known commercial activities or ethnic features.

SUMMARY

The disclosure is directed to a geographical location rendering system and method and a computer readable recording medium. User generated contents containing geographical location information are utilized as a data source for calculating density information of respective regions, so as to identify a semantic region and a name of the semantic region through clustering and data mining.

According to an embodiment, a geographical location rendering method is provided. The method is executed in a geographical location rendering system for identifying a semantic region. A density clustering is performed on a plurality of user generated contents having respective geographical location name information to generate a plurality of region candidates. A name extraction is performed on the region candidates to extract and confirm a common region name of the region candidates as a name of the semantic region. A region scope of the region candidates is detected as a location scope of the semantic region according to a spatial density analysis.

According to another embodiment, a geographical location rendering system for identifying a semantic region is provided. The system includes: a density clustering module, a name extraction module and a region scope detecting module. The density clustering module performs a density clustering on a plurality of user generated contents having respectively geographical location name information to generate a plurality of region candidates. The name extraction module performs a name extraction on the region candidates to extract and confirm a common region name of the region candidates as a name of the semantic region. The region scope detecting module detects a region scope of the region candidates as a location scope of the semantic region according to a spatial density analysis.

According to another embodiment, provided is a computer readable recording medium for storing a program, capable of implementing the above geographical location rendering method after the program is loaded on a computer and is executed.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments are related to a geographical location rendering system and method and a computer readable recording medium. By use of spatial density information of stores and data mining of comments on stores, a semantic region having a geographical location name and a location scope is defined.

Figure 1:
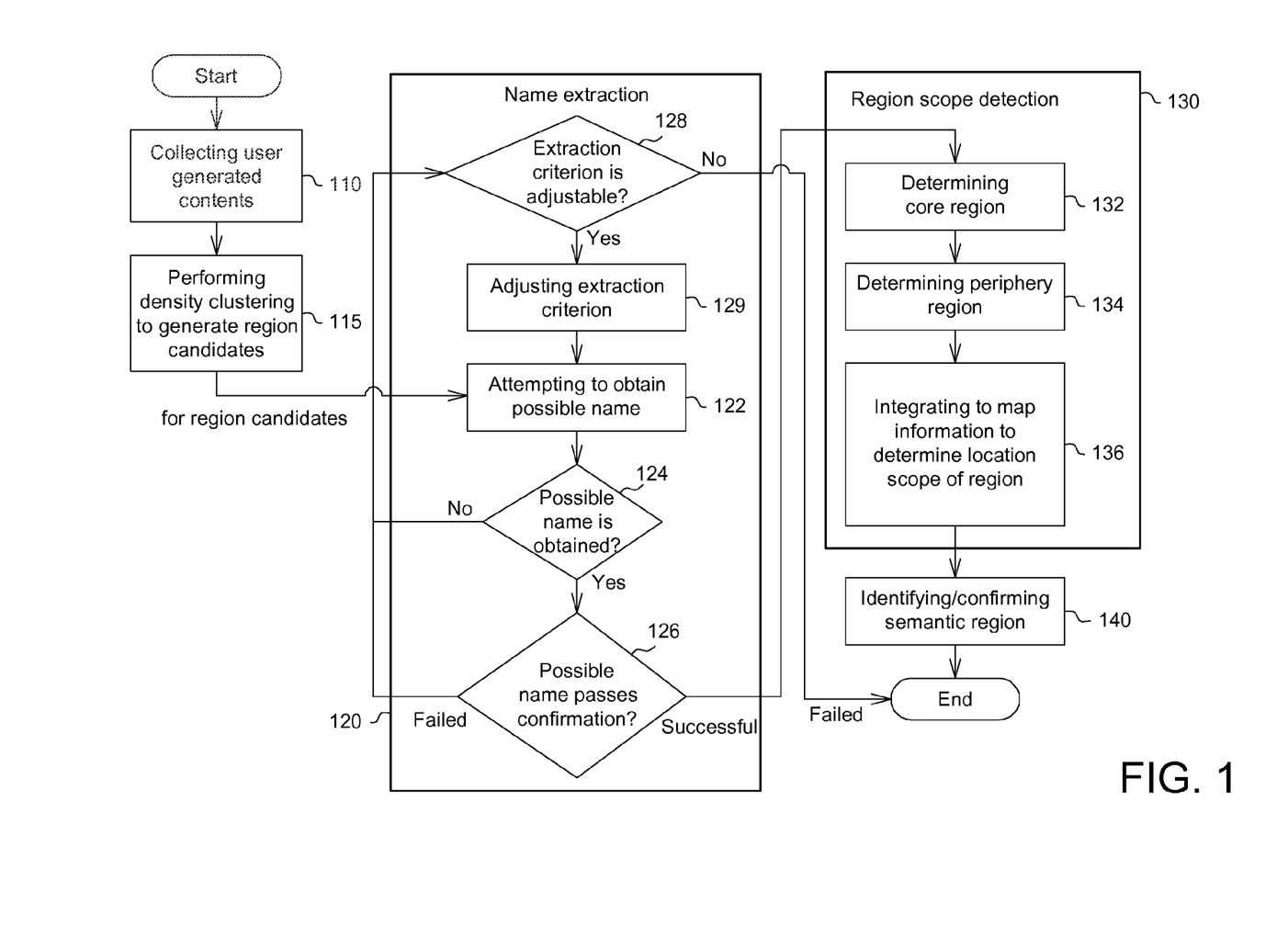
FIG. 1 is a flowchart for identifying a semantic region according to an embodiment.

FIG. 1 shows a flowchart for identifying a semantic region according to an embodiment. Referring to FIG. 1, in Step 110, user generated contents are collected. For example, the user generated contents include store information (e.g., an address and a geographical location name of the store) and store comment on Internet.

In Step 115, a density clustering is performed on the collected user generated contents to generate a plurality of region candidates. In the description below, region candidates, clusters and groups in principal have the same or similar meaning. When demarcating scopes of region candidates, the region candidates have different densities and thus a plurality of region candidates are obtained. That is, grouping is performed on regions having different densities to obtain a plurality of region candidates. Alternatively, a plurality of region candidates may also be obtained through setting a plurality of sets of radius parameters.

In Step 120, a name extraction is performed on the region candidates to confirm a name of the region. For example, in Step 120, an information extraction algorithm and/or a natural language processing (NLP) algorithm is performed to extract a name of each cluster and to confirm the extracted name of the group. When information (e.g., information associated with a store) is not concentrated in a minority of the clusters, the extracted name is not adopted. According to a result of the name extraction and name confirmation, a strictness of the extraction criterion may be adjusted to obtain an appropriate name. Details of Step 120 shall be described shortly.

In Step 122, an attempt for obtaining a possible name of the region candidates is made. There may be one or more approaches for obtaining the possible name, with details of the approaches being unlimited.

In Step 124, it is determined whether the name is obtained. That is, it is possible that the attempt for obtaining the possible name in Step 122 is unsuccessful. For example, the unsuccessful attempt may be due to an inappropriate extraction criterion. When the attempt for obtaining the possible name is unsuccessful, the extraction criterion ought to be adjusted.

Figure 2A:
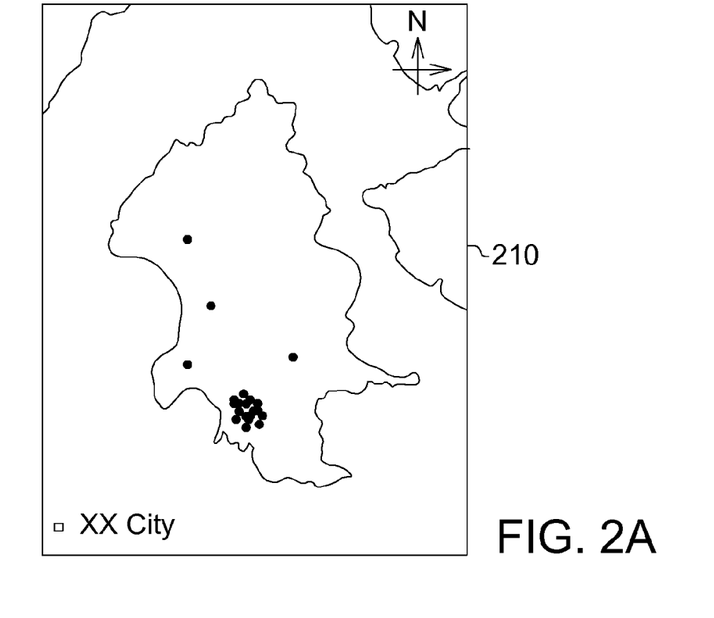
FIGS. 2A and 2B are respectively an example of a region name distribution and a non-region name distribution according to an embodiment.
Figure 2B:
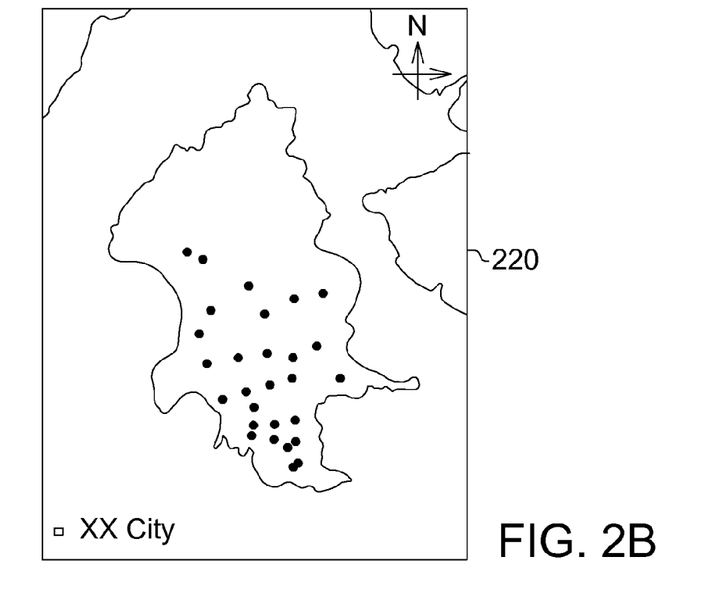

In Step 126, it is confirmed whether the possible name passes and is adopted. The name is not adopted if the distribution is not concentrated at a minority of the clusters. That is to say, when the name is appropriate, the density of the cluster is higher, and vice versa. Taking the neighborhood of SoHo for example, when internet comment information on a store contains SoHo, it is much likely that the store is located in the SoHo area. Therefore, if the extracted possible name is SoHo, the store distribution corresponding to store information containing SoHo is likely concentrated in the SoHo area. FIGS. 2A and 2B respectively show examples of a region name distribution 210 and a non-region name distribution 220. A so-called "region name distribution" infers that, a distribution of the user generated contents is more concentrated if the extracted name is a reasonable region name. A so-called "non-region name distribution" infer that, a distribution of the user generated contents is more dispersed if the extracted name is a reasonable region name.

Figure 3A:
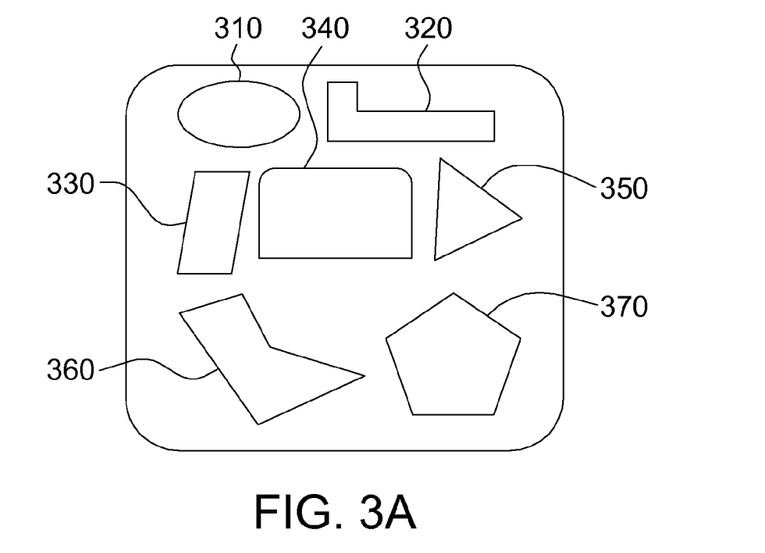
FIGS. 3A to 3D are schematic diagrams of name confirmation according to an embodiment.
Figure 3B:
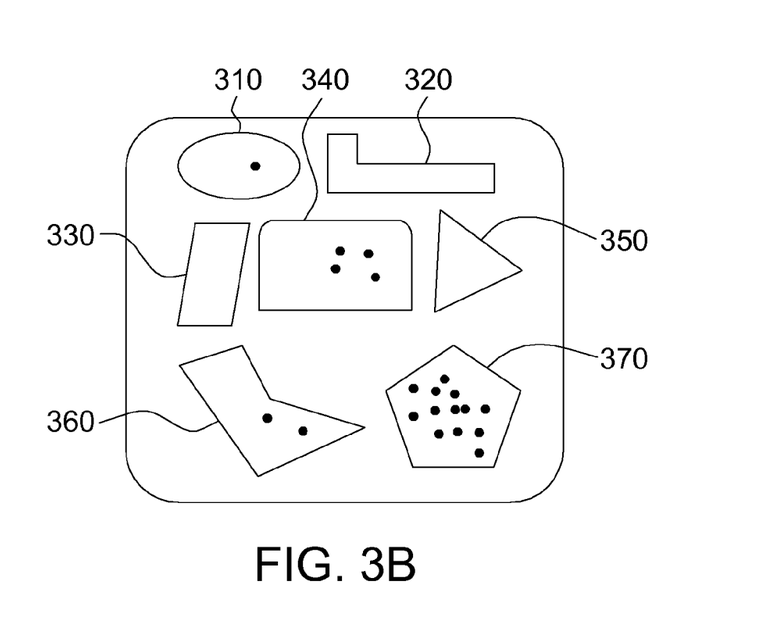
Figure 3C:
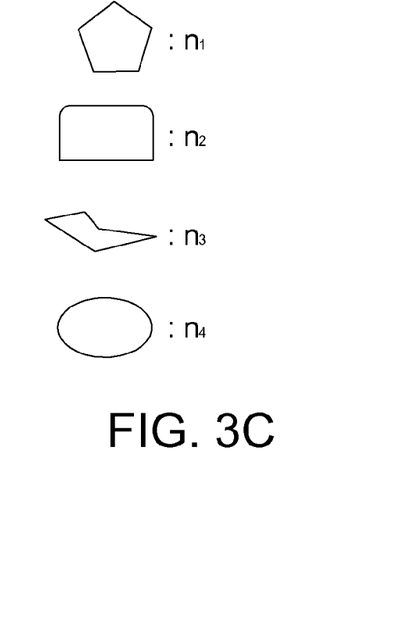
Figure 3D:
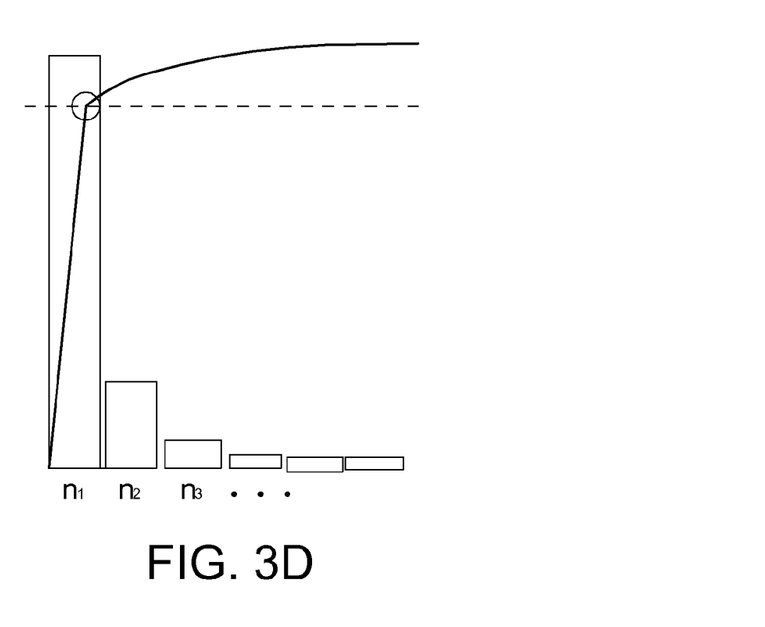

FIGS. 3A to 3D are schematic diagrams of a name confirmation procedure according to an embodiment. FIG. 3A shows a plurality of region candidates 310 to 370. FIG. 3B shows distribution points of a name in the region candidates. FIG. 3C shows numbers and ordering of the distribution points of the name, assuming that the numbers are n1 to n4. In FIG. 3D, the numbers are accumulated till an accumulated number satisfies a threshold condition (e.g., 80%). That is, as shown in FIG. 3D, assuming an accumulated number "n1+n2, . . . , +nk" (nk representing the number of distribution points in k-th region) occupy a threshold condition (e.g., 80%) of the total number (n1+n2+n3, . . . ) and k is smaller than a threshold value, it means the density concentration is high. In contrast, when the threshold condition is exceeded after accumulating more region candidates (more than the threshold value), it means the density concentration is low. The name having a high density concentration is regarded as having passed the name confirmation. Further, the threshold condition and the threshold value are adjustable.

The process proceeds to Step 130 when the name confirmation is passed, or else the process proceeds to Step 128 when the name confirmation is failed.

In Step 128, it is determined whether the extraction criterion is adjustable. When the extraction criterion is non-adjustable, it means that an appropriate name cannot be extracted no matter the strictness for the extraction criterion is set to high or low, and so the name extraction is failed.

In Step 129, the extraction criterion is adjusted. Irrelevant names may be obtained if a loose extraction criterion is set, and noise can be resulted to undesirably affect the outcome. On the other hand, if a strict extraction criterion is set, information supposedly be captured may be missed or even no name can be extracted. Alternatively, in an embodiment, the strictness for the extraction criterion is initially set to high, and gradually lowered when no name is extracted till an individual name is extracted (the lowest strictness). The region candidate is discarded in the event that no name can be extracted after performing the name extraction with a loosest extraction criterion.

In Step 130, for a region with a confirmed name, a region scope of the region is detected and confirmed according to a spatial density analysis. Step 130 includes three sub-steps 132 to 136.

Figure 4:
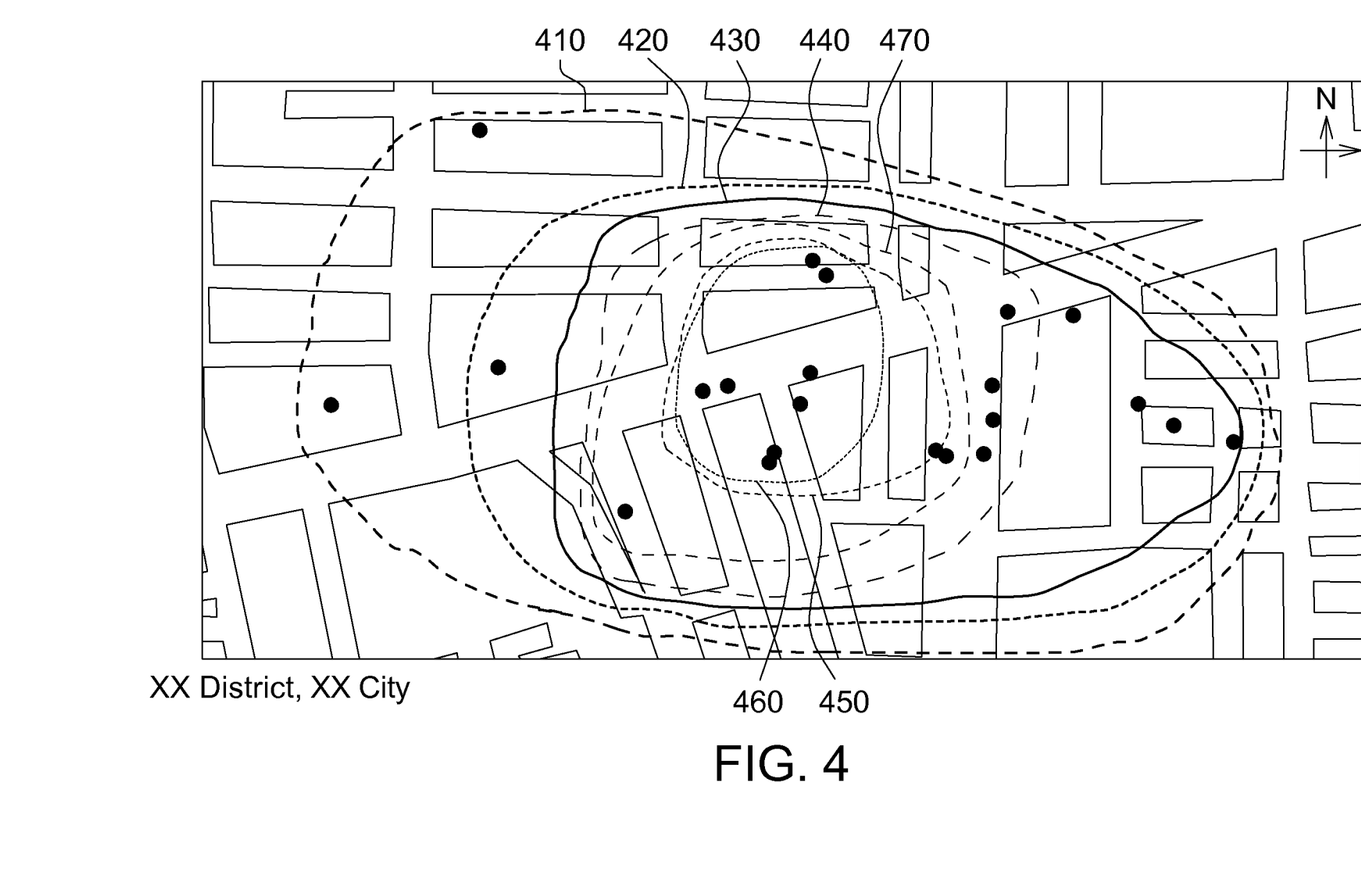
FIG. 4 is a schematic diagram of name densities of clusters according to an embodiment.

In Sub-step 132, a core region is determined. For example, among a plurality of region candidates having the same name, the region candidate (cluster) having a highest name density is regarded as the core region. The term "name density" refers to a percentage occupied by stores having the name out of a total number of stores in the region candidate. FIG. 4 shows a schematic diagram of a name density of a cluster according to an embodiment. In FIG. 4, reference symbols 410 to 470 respectively represent the region candidates. Since the region candidate 470 has the highest name density, the region candidate 470 is regarded as the core region.

Figure 5:
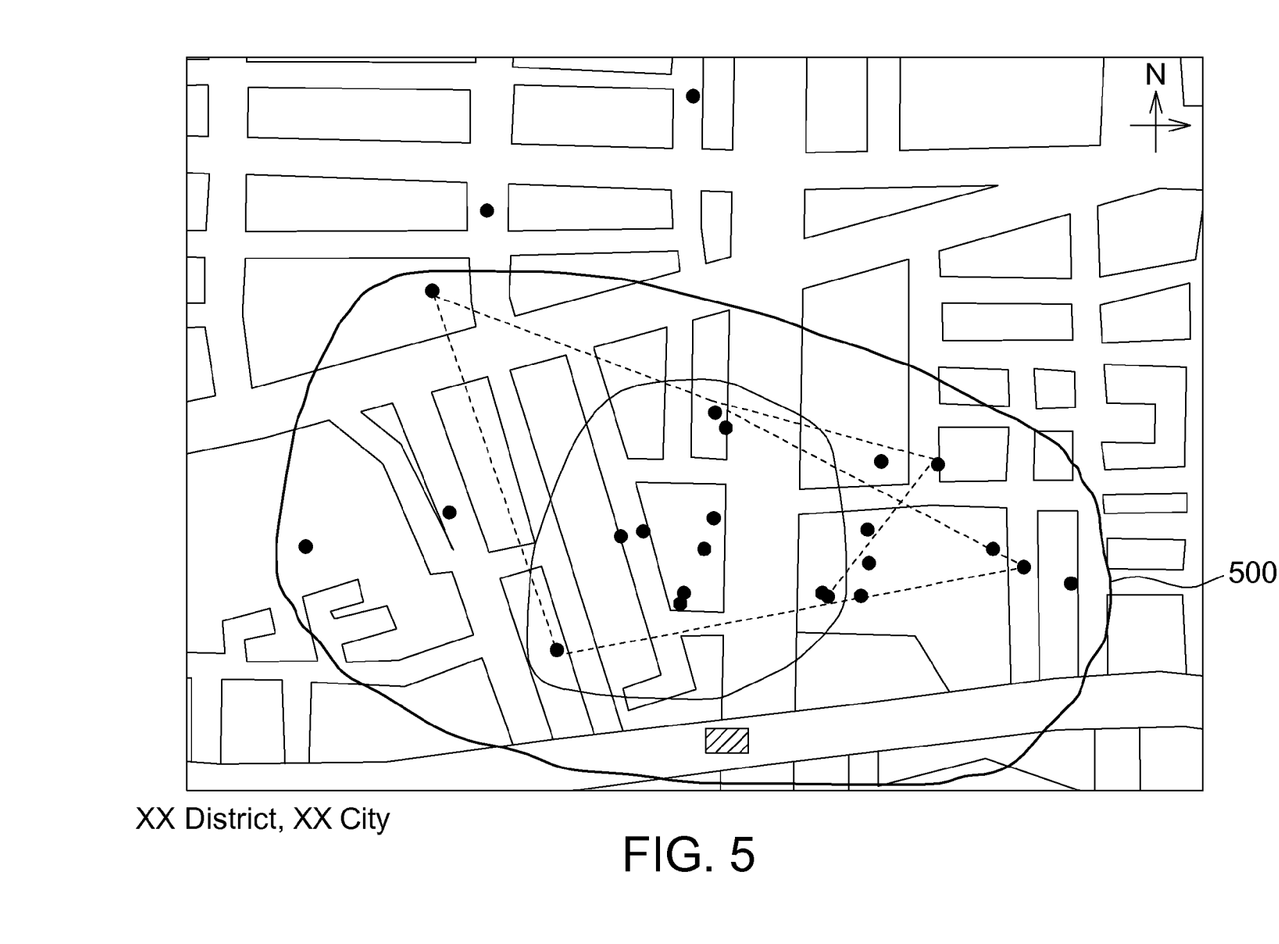
FIG. 5 is a periphery region according to an embodiment.

In Sub-step 134, a periphery region is determined. An outermost periphery region jointly formed by the region candidates is determined as a periphery region of the semantic region. For example, outermost coordinates collectively formed by the clusters (region candidates) having the confirmed name are identified, wherein the store on the outermost coordinates involves the confirmed name. As shown in FIG. 5, a fan-shaped region is formed by connecting the outermost coordinates with the coordinates of the core region, and an irregular polygon is formed by the fan-shaped regions and the core region. FIG. 5 shows a periphery region 500 according to an embodiment. Details of selecting the periphery region are not limited to the approach above. For example, two random points in the core region are selected until the two randomly-selected points together with an outermost coordinate form a triangle having a largest possible area. The triangle is then regarded as the periphery region.

Figure 6:
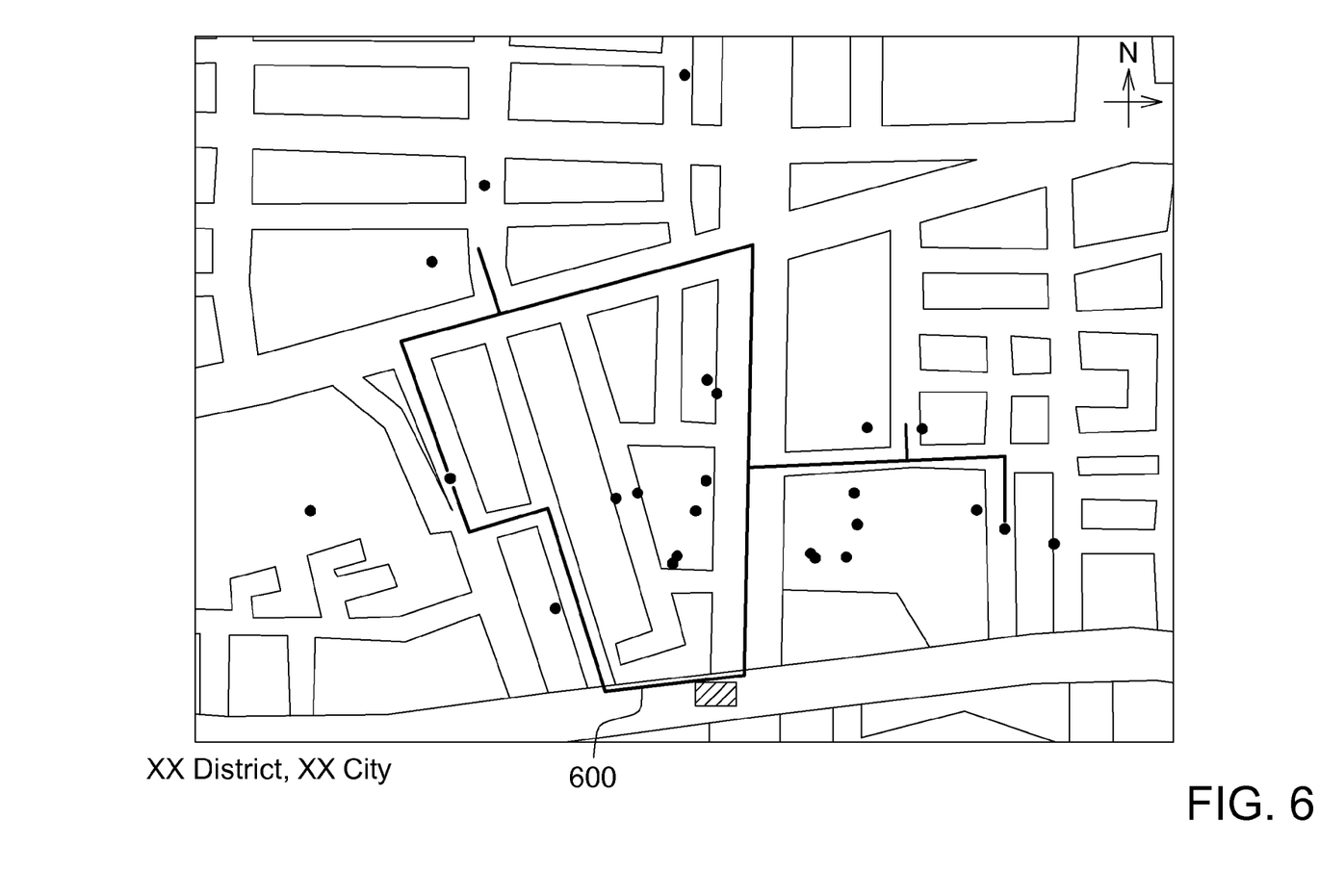
FIG. 6 is a location scope of a semantic region identified according to an embodiment.

In Sub-step 136, the core region and the periphery region are integrated with map information to determine a location scope of the semantic region. With reference to street data provided by the map information, when a shortest path between two neighboring outermost coordinates is located outside the core region and the fan-shaped region, the shortest path is regarded as a part of a periphery of the region. A scope surrounded by the core region, the fan-shaped regions and the shortest paths defines a location scope of the semantic region. FIG. 6 shows a location scope 600 of a semantic region determined according to an embodiment.

After determining the location scope of the semantic region, the semantic region may be identified or confirmed in Step 140. In this embodiment, not only the name of the semantic region may be identified but also a location scope of the semantic region may be confirmed.

Further, in an alternative embodiment, the name extraction and the region scope detection are mutually facilitated. More specifically, as shown in FIG. 1, when a name cannot be extracted, the region candidate is discarded, which equivalently facilitates the region scope detection. On the other hand, in demarcating the region candidates in Step 115, the scopes of the region candidates are not demarcated unfoundedly but are demarcated according to the density information. That is, the density information of the region candidates is meaningful. When the density of the stores having the same meaningful name has a higher density, it infers that the stores are possibly located in the semantic region, and so such approach for demarcating the region candidates facilitates the process of identifying meaningful names.

Figure 7:
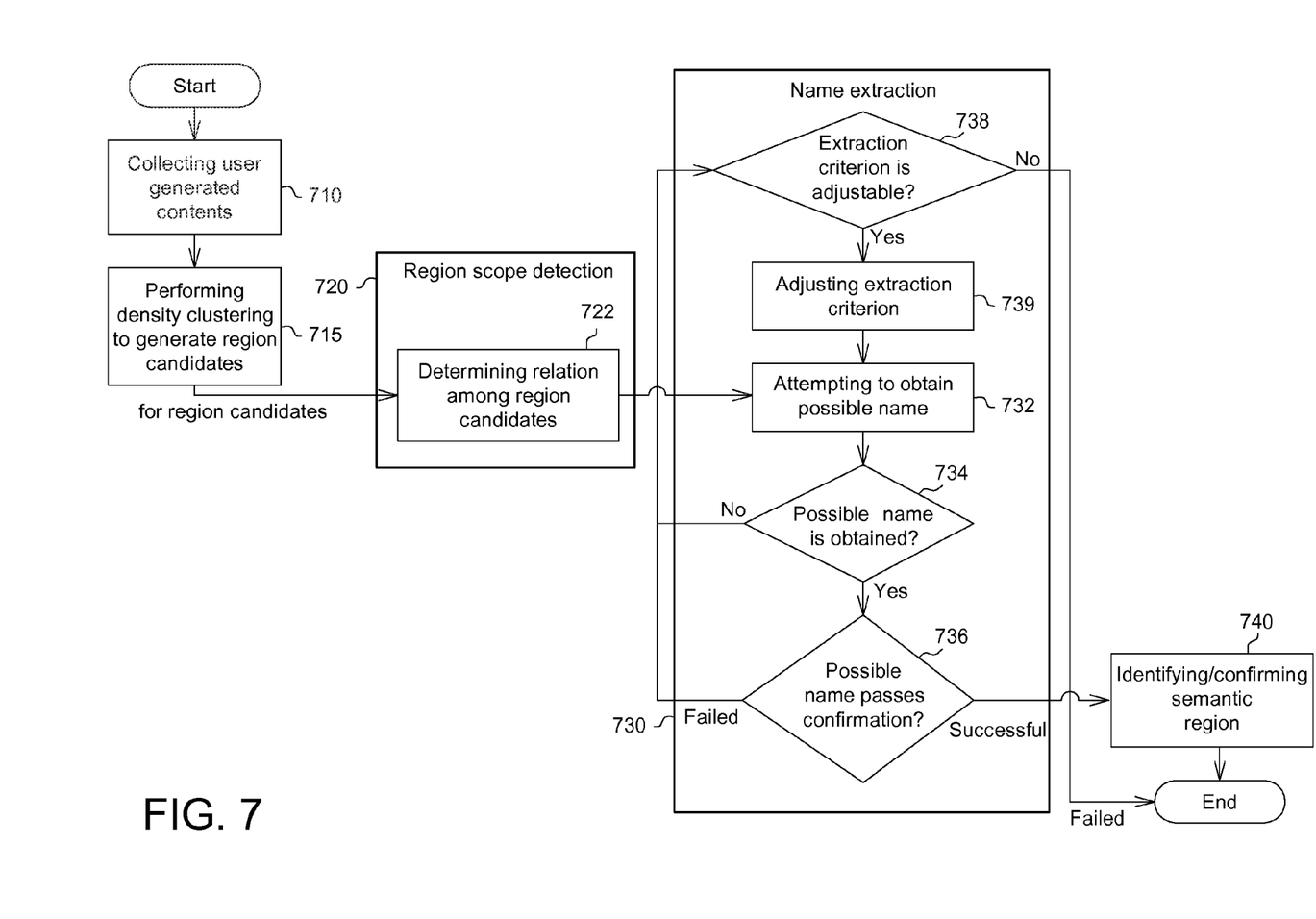
FIG. 7 is a flowchart for identifying a semantic region according to another embodiment.

FIG. 7 shows a flowchart for identifying a semantic region according to an embodiment. Steps 710, 715 and 740 are identical or similar to Steps 110, 115 and 140 in FIG. 1, and related details are thus omitted herein.

In Step 720, a region scope is detected. Step 720 includes a Sub-step 722. In Sub-step 722, a relation among the region candidates is determined. For example, among the region candidates, it is determined whether an equal-set relation, a superset-subset relation, or partially-overlapping-set relation exists. In Step 730, the name extraction is performed together on the region candidates having relation. That is because, the region candidates having a relation means that these region candidates are likely located in the same semantic region. Therefore, in an embodiment, the name extraction is performed collectively on these region candidates.

For example, assume that among region candidates 1 to 6 generated in Step 715, the region candidates 1 and 2 have a relation whereas the remaining region candidates 3 to 6 do not have a relation. In an embodiment, name extraction is performed together on the regions 1 and 2, and name extraction is performed individually on the regions 3 to 6.

Step 730 is substantially identical to Step 120. Step 730 includes Sub-steps 732, 734, 736, 738 and 739, which are substantially identical to Sub-steps 122, 124, 126, 128 and 129.

However, when the name extraction is performed together on the region candidates having a relation, in Step 734, it is determined that 1) whether a name for the respective region candidate is respectively extracted, and 2) whether the extracted names are the same. The reason for the above is that, as previously described, region candidates having a relation are possibly located in the same semantic region. Thus, when the names extracted for the region candidates having a relation are different, it means that the extracted names are not the desired name.

In another embodiment, through the relation among the region candidates (e.g., a relation of name commonality in a subset and a superset), a common name is extracted and a faith index is set for each of the clusters (i.e., region candidates). An outermost peripheral scope formed by the clusters is the location scope of the semantic region.

To adapt to future changes and/or information updates, the scope and name of the semantic region may be redefined. For new data, any of the two above embodiments may be executed periodically or non-periodically to redefine the scope and name of the semantic region.

Alternatively, in another embodiment, for new data (e.g., a new store) added within a short period of time, the two above embodiments may be implemented on the region according to 1) a rule-base mechanism, or 2) a partial area reprocess, so as to update the scope and/or name of the semantic region or even to generate a new semantic region.

Further, when the new data falls in a previously named semantic region, the region scope detection (according to FIG. 1 or FIG. 7) is again performed on the semantic region to update the scope of the semantic region.

When the new data falls in unnamed region candidates, the name extraction and region scope detection are performed on the unnamed region candidates to update the name and scope of the regions (i.e., to attempt to determine the name for the region).

Figure 8:
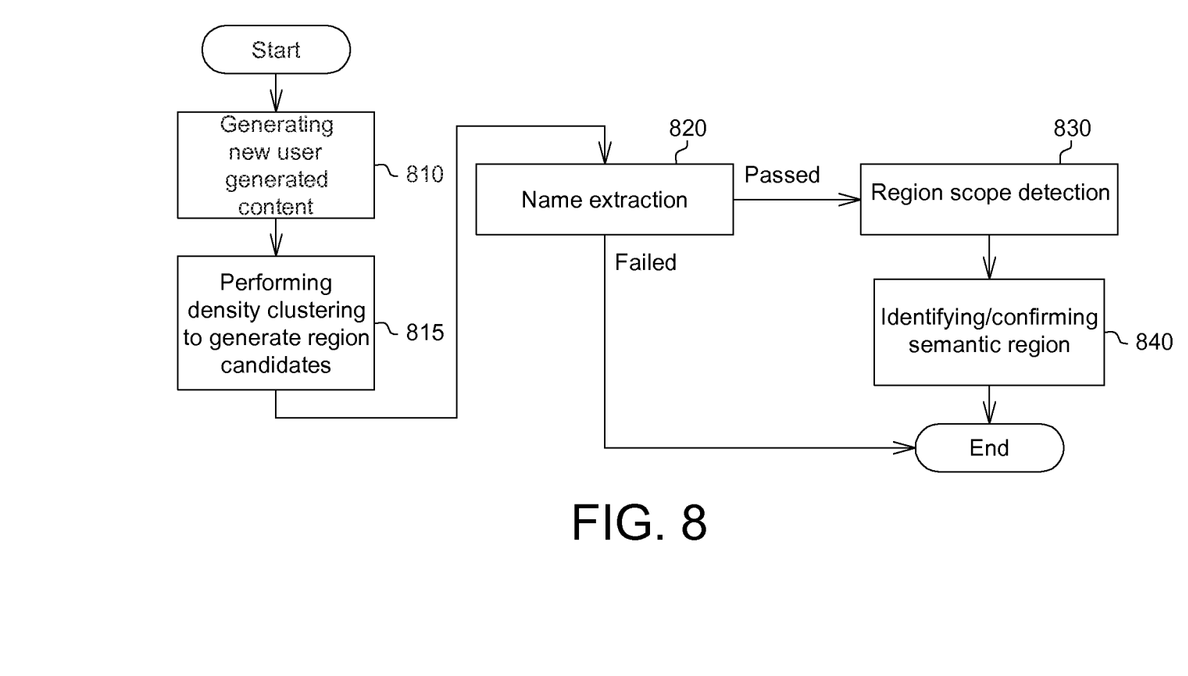
FIG. 8 is a flowchart of a partial area reprocess according to another embodiment.

FIG. 8 shows a flowchart of a partial area reprocess according to another embodiment. The partial area reprocess is performed when the new data does not fall in any of the regions. Referring to FIG. 8, in Step 810, a new user generated content is obtained. In Step 815, the density clustering is performed on the new user generated content to generate at least one new region candidate. In Step 820, the name extraction is performed on the new region candidates. Step 820 is identical or similar to Step 120 in FIG. 1 and/or Step 730 in FIG. 7, and details thereof are thus omitted herein.

In Step 830, the region scope detection is performed. The region scope detection is performed on the region candidates having the same name as that of the new region candidates. Step 830 is identical or similar to Step 130 in FIG. 1 and/or Step 720 in FIG. 7, and details thereof are omitted herein.

In FIG. 8, although the name extraction is performed before the region scope detection, it should be noted that the region scope detection may be performed before the name extraction in other embodiments and such modification is also encompassed within the spirit of the disclosure.

Figure 9A:
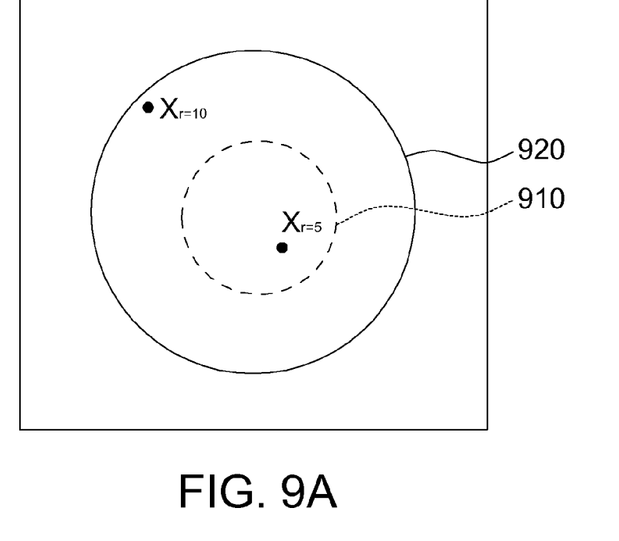
FIGS. 9A and 9B are schematic diagrams of a partial area reprocess according to yet another embodiment.
Figure 9B:
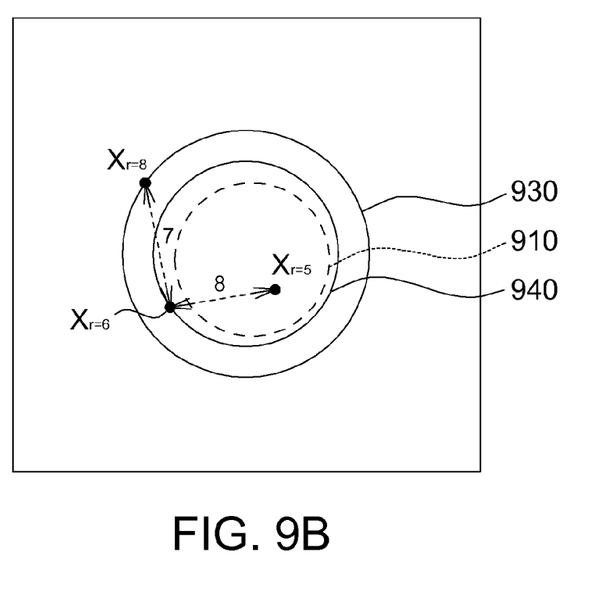

FIGS. 9A and 9B show schematic diagrams of a partial area reprocess according to another embodiment. The partial area reprocess is performed on coordinates affected by new data (or new coordinates). Cluster densities may be changed due to the newly added coordinates, and so density clustering, name extraction and region scope detection are again performed on the density-changed coordinates.

With reference to FIGS. 9A and 9B, details for re-clustering due to the newly added coordinates shall be explained. As shown, a coordinate $X_r=5$ falls in a region candidate 910 generated from a radius parameter of 5; a coordinate $X_r=10$ falls in a region candidate 920 generated from a radius parameter of 10. When a new coordinate $X_r=6$ (in FIG. 9B) is added, the scope of the region candidate 910 (where the coordinate $X_r=5$ is located) remains unchanged. However, due to the newly added coordinate $X_r=6$, a new region candidate 930 generated from a radius parameter of 8 covers all coordinates in the region candidate 920. For the coordinate $X_r=6$, a new candidate 940 having a radius parameter of 6 is generated.

According to another embodiment, a location rendering system including a density clustering module, a name extraction module and a region scope detection module is provided. The density clustering module performs Step 115 in FIG. 1, Step 715 in FIG. 7 and Step 815 in FIG. 8. The name extraction module performs Step 120 in FIG. 1, Step 730 in FIG. 7 and Step 820 in FIG. 8. The region scope detection module performs Step 130 in FIG. 1, Step 720 in FIG. 7 and Step 830 in FIG. 8. Details of the modules may be referred to in the related description of the foregoing embodiments, and shall be omitted herein.

For example, the density clustering module, the name extraction module and the region scope detection module may be implemented by a processing unit, a digital signal processing unit or a digital video processing unit, or a programmable integrated circuit such as a microprocessor or a Field Programmable Gate Array (FPGA) circuit, and are designed using Hardware Description Language (HDL).

Further, the methods of the foregoing embodiments (e.g., in FIGS. 1, 7 and 8) may be implemented by a software program. For example, codes for the method according to an embodiment is recorded in a memory medium such as a memory (ROM or RAM), an optical or magnetic medium or another type of medium. Alternatively, codes for the method according to an embodiment may be implemented by firmware. When the memory medium storing codes of the method of the disclosure is accessed and executed by a processing unit of an operation apparatus, the method of the disclosure may be implemented. Further, the method of the disclosure may be implemented by a combination of software and hardware.

According to yet another embodiment, a computer-readable record medium is provided. The computer-readable record medium stores a program, capable of implementing any one of the above-described methods in the above embodiments after the program is loaded on a computer and is executed.

According to yet another embodiment, a computer program product storing a geographical location rendering program is provided. When a computer loads and executes the computer program, any one of the above-described methods in the above embodiments may be implemented.

In the foregoing embodiments, for example, the semantic region includes a region name and/or landmark. The region name and/or landmark of the foregoing embodiments are communication-intuitive, and include light-weight information allowing a user for a quick interpretation.

For example, the above embodiments are applied in applications including photo tagging, query expansion with location tag, and auto location tagging for web content, as well as personal location sharing techniques of social networks, mobile applications and mobile commerce.

Taking photo tagging for example, when a user posts and shares a photograph captured using a camera supporting a Global Position System (GPS) function on the Internet, a semantic region where the photograph is taken may be identified based on GPS location information according the technique of the foregoing embodiments. When the user shares the photograph on the Internet, the share information may also include associated information of the semantic region. For example, besides photographs, the share information may also include information of the semantic region (e.g., SoHo in Manhattan, NYC) to indicate where the photograph was taken.

For query expansion with location tag, it may be determined in which semantic region a store is located according to the foregoing embodiments. Therefore, web introduction information of the store on the Internet may further include the semantic region in which the store is located. So, for example, coffee shops in the semantic region may be identified accordingly.

Taking auto location tagging for web content for example, a semantic region tag may be added to information shared by a user (e.g., introduction and comments on a store). For example, a "SoHo" tag is added to the introduction and comments on the store, such that the store is found as a search result when searching "SoHo".

For personal location sharing technique of a social network, e.g., a check-in technique of Facebook, it may be determined in which semantic region a user is located according to the foregoing embodiments. Therefore, when the user shares location information, the shared information may further include a semantic public information tag. Further, the user may even set information share level according to personal relevancy. For example, friends having a higher relevancy (closer friends) are allowed to see more information for example, the user was checked-in at "Soho, Manhattan", whereas friends having a lower relevancy are allowed to see less information, e.g., the user is checked-in at NYC.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A geographical location rendering method performed by an electronic device, executed in a geographical location rendering system for identifying a semantic region, the geographical location rendering method comprising:
   performing a density clustering on a plurality of user generated contents having respective information of geographical location name, to generate a plurality of region candidates;
   performing a name extraction on the region candidates respectively, wherein if a common region name is extracted from the region candidates, the common region name is used as a name of the semantic region, wherein the step of performing a name extraction further comprises:
      attempting to obtain a possible name for the region candidate;
      determining whether the possible name of the region candidate is obtained;
      when no possible name is obtained, adjusting an extraction criterion; and
      when the extraction criterion is non-adjustable, determining the name extraction as failed and discarding the region candidate; and
   detecting a region scope of the region candidates as a location scope of the semantic region according to a spatial density analysis.

2. The method according to claim 1, wherein the step of performing the name extraction comprises:
   determining whether the possible name passes a concentration verification.

3. The method according to claim 2, wherein the step of performing the name extraction comprises:
   when the user generated contents in the region candidate are concentrated, determining that the possible name passes the concentration verification;
   when the user generated contents in the region candidate are dispersed, determining that the possible name fails the concentration verification;
   adjusting the extraction criterion when the possible name fails in the concentration verification; and
   determining the step of performing a name extraction as failed and discarding the region candidate when the extraction criterion is non-adjustable.

4. The method according to claim 1, wherein the step of performing the name extraction comprises:
when adjusting the extraction criterion, a strictness for the extraction criterion is gradually lowered till a reaching a lowest strictness for the extraction criterion.

5. The method according to claim 4, wherein the step of detecting the region scope comprises:
for the region candidates passed the name extraction and having the same name, selecting one of the region candidates having a highest name density of the region candidates as a core region of the semantic region;
wherein, a name density represents a percentage occupied by the user generated contents having the same name out of a total number of the user generated contents.

6. The method according to claim 5, wherein the step of detecting the region scope comprises:
for the region candidates passed the name extraction and having the same name, determining an outermost periphery region jointly formed by the region candidates as a periphery region of the semantic region.

7. The method according to claim 6, wherein the step of detecting the region scope comprises:
integrating the core region and the periphery region to a map information to determine the location scope of the semantic region.

8. The method according to claim 1, wherein the step of detecting the region scope comprises:
determining a relation among the region candidates to collectively perform the name extraction on the region candidates having the relation.

9. The method according to claim 8, wherein when performing the name extraction on the region candidates having the relation, the step of the name extraction comprises:
determining whether an individual name is extracted respectively for the region candidates; and
determining whether the individual names of region candidates are the same.

10. The method according to claim 9, wherein a common name is obtained for the region candidates through the relation among the region candidates, and an outermost periphery region formed by the region candidates is the location scope of the semantic region.

11. The method according to claim 1, wherein when a new user generated content falls in the semantic region, the step of detecting the region scope is again performed on the semantic region.

12. The method according to claim 1, wherein when a new user generated content falls in unnamed region candidates of the region candidates, the step of performing the name extraction and the step of detecting the location scope are again performed on the unnamed region candidates.

13. The method according to claim 1, wherein when a new user generated content does not fall in any of the region candidates, the method further comprising:
performing the density clustering on a region of the new user generated content to generate at least one new region candidate;
performing the name extraction step on the at least one new region candidate; and
performing the step of detecting the location scope on the region candidates having the same name as the at least one new region candidate.

14. A geographical location rendering system embodied in an electronic device, for identifying a semantic region, comprising:

a density clustering module, for performing a density clustering on a plurality of user generated contents having respective information of geographical location name to generate a plurality of region candidates;
a name extraction module, for performing a name extraction on the region candidates respectively, wherein if the name extraction module extracts a common region name from the region candidates, the common region name is used as a name of the semantic region; and
a region scope detecting module, for performing a region scope detection on the region candidates as a location scope of the semantic region according to a spatial density analysis, wherein
the name extraction module attempts to obtain a possible name for a region candidate of the region candidates;
the name extraction module determines whether the possible name of the region candidate is obtained;
when no possible name is obtained, the name extraction module adjusts an extraction criterion;
when the extraction criterion is non-adjustable, the name extraction module determines the name extraction as failed and discards the region candidate;
the name extraction module determines whether the possible name passes a concentration verification;
when the user generated contents in the region candidate are concentrated, the name extraction module determines the possible name passes the concentration verification;
when the user generated contents in the region candidate are dispersed, the name extraction module determines the possible name fails the concentration verification;
the name extraction module adjusts the extraction criterion when the possible name fails confirmation; and
the name extraction module determines the name extraction as failed and discards the region candidate when the extraction criterion is non-adjustable;
wherein, when adjusting the extraction criterion, a strictness for the extraction criterion is gradually lowered till a reaching a lowest strictness of the extraction criterion.

15. The system according to claim 14, wherein:
for the region candidates having passed the name extraction and having the same name, the region scope detecting module selects one of the region candidates having a highest name density of the region candidates as a core region of the semantic region;
a name density represents a percentage occupied by the user generated contents having the name out of a total number of the user generated contents;
for the region candidates passed the name extraction and having the same name, the region scope detecting module determines an outermost periphery region jointly formed by the region candidates as a periphery region of the semantic region; and
the region scope detecting module integrates the core region and the periphery region to a map information to determine the location scope of the semantic region.

16. The system according to claim 15, wherein:
the region scope detecting module determines a relation among the region candidates to collectively perform the name extraction on the region candidates having the relation; and
when the name extraction is collectively performed on the region candidates having the relation, the name extraction module determines whether an individual name is extracted respectively for the region candidates, and determines whether the individual names of region candidates are the same.

17. The system according to claim 16, wherein a common name is obtained for the region candidates through the relation among the region candidates, and the outermost periphery region formed by the region candidates is the location scope of the semantic region.

18. The system according to claim 14, wherein:
when a new user generated content falls in the semantic region, the region scope detection is again performed on the semantic region;
when the new user generated content falls in unnamed region candidates of the region candidates, the name extraction and the region scope detection are again performed on the unnamed region candidates; and
when a new user generated content does not fall in any of the region candidates, the density clustering is performed on a region of the new user generated content to generate at least one new region candidate, the name extraction is performed on the at least one new region candidate, and the region scope detection is again performed on the region candidates having the same name as the at least one new region candidate.

19. A non-transitory computer readable recording medium for storing a program, capable of implementing a method according to claim 1 after the program is loaded on a computer and is executed.

* * * * *